(12) United States Patent
Shim et al.

(10) Patent No.: US 7,623,587 B2
(45) Date of Patent: Nov. 24, 2009

(54) METHOD FOR TRANSMITTING/RECEIVING SIGNAL IN MIMO SYSTEM

(75) Inventors: Dong-Hee Shim, Seoul (KR);
Hee-Joung Lee, Gyeonggi-do (KR);
Kang-Suk Huh, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 632 days.

(21) Appl. No.: 11/038,675

(22) Filed: Jan. 19, 2005

(65) Prior Publication Data

US 2005/0157807 A1   Jul. 21, 2005

Related U.S. Application Data

(60) Provisional application No. 60/537,714, filed on Jan. 20, 2004, provisional application No. 60/545,934, filed on Feb. 20, 2004.

(30) Foreign Application Priority Data

Feb. 9, 2004   (KR) .................... 10-2004-0008446
Feb. 9, 2004   (KR) .................... 10-2004-0008450

(51) Int. Cl.
*H04B 7/02*   (2006.01)
(52) U.S. Cl. ..................................... 375/267
(58) Field of Classification Search ................ 375/259, 375/260, 267, 295, 299, 316, 346, 347, 345
See application file for complete search history.

(56) References Cited

U.S. PATENT DOCUMENTS 5,764,699 A   6/1998   Needham et al.

(Continued)

FOREIGN PATENT DOCUMENTS

EP   0999658   5/2000

(Continued)

OTHER PUBLICATIONS

Paulraj et al. "Optimal Antenna Selection in MIMO Systems with Space-Time Block Coding" IEICE Trans. Commun. vol. E84-B, No. 7, Jul. 2001.

(Continued)

*Primary Examiner*—Kevin M Burd
(74) *Attorney, Agent, or Firm*—Lee, Hong, Degerman, Kang & Waimey (57) ABSTRACT

Disclosed is a method for transmitting a signal in a mobile communications system using a plurality of transmit/receive antennas. A method for transmitting a signal in accordance with an embodiment of the present invention comprises the steps of: a receiving end's calculating a signal to interference noise ratio (SINR) with respect to every antenna pairs configuring STTD pairs to be transmittable from a transmitting end; feedbacking information indicating an antenna pair having the greatest SINR to the transmitting end; and the transmitting end's performing a D-STTD transmission through the antenna pair determined by the feedbacked information. A method for transmitting a signal in accordance with another embodiment of the present invention comprises the steps of: a receiving end's feedbacking information of an antenna pair and/or an eigenvector (weight vector) of a channel matrix with respect to transmit antennas included in the space-time multiplexing (STTD) pair to a transmitting end; and the transmitting end's forming beam by multiplying a symbol with respect to each STTD pair by the eigenvector, and thereafter transmitting the beam through each transmit antenna (in case of using two antennas) or a transmit antenna pair (in case of using more than four antennas) determined by the information of the antenna pair.

7 Claims, 6 Drawing Sheets

U.S. PATENT DOCUMENTS

| | | | |
|---|---|---|---|
| 2002/0196842 A1* | 12/2002 | Onggosanusi et al. | 375/148 |
| 2003/0003863 A1* | 1/2003 | Thielecke et al. | 455/39 |
| 2003/0026349 A1* | 2/2003 | Onggosanusi et al. | 375/267 |
| 2003/0060173 A1* | 3/2003 | Lee et al. | 455/103 |
| 2003/0139194 A1* | 7/2003 | Onggosanusi et al. | 455/506 |
| 2003/0181170 A1* | 9/2003 | Sim | 455/101 |

FOREIGN PATENT DOCUMENTS

| | | |
|---|---|---|
| EP | 1073212 | 1/2001 |
| JP | 2000-101667 | 4/2000 |
| KR | 1020030015963 | 2/2003 |

OTHER PUBLICATIONS

Mitsubishi "DSTTD with Sub-Group Rate Control" 3GPP TSG RAN WG1 #31, Feb. 18-21, 2003.

* cited by examiner

METHOD FOR TRANSMITTING/RECEIVING SIGNAL IN MIMO SYSTEM

CROSS-REFERENCE TO RELATED APPLICATIONS

Pursuant to 35 U.S.C. § 119(a), this application claims the benefit of earlier filing dates and right of priority to Korean Application Nos. 10-2004-0008446 and 10-2004-0008450, filed on Feb. 9, 2004, the contents of which are hereby incorporated by reference herein in their entirety.

Pursuant to 35 U.S.C. § 119(e), this application claims the benefit of earlier filing dates and right of priority to Provisional Application Nos. 60/537,714, filed on Jan. 20, 2004 and 60/545,934, filed on Feb. 20, 2004, the contents of which are hereby incorporated by reference herein in their entirety.

BACKGROUND OF THE INVENTION

1. Field of the Invention

The present invention relates to a method for transmitting a signal in a mobile communications system, and particularly, to a method for transmitting a signal in an MIMO system using a plurality of transmit/receive antennas.

2. Background of the Related Art

Recently, IMT-2000 system based on a third generation partnership project (3GPP) of W-CDMA wireless specification has adopted a space time transmit diversity (STTD) as an open loop type transmit diversity technique. The STTD refers to a technique for achieving a diversity advantage through a space-time coding extending a channel coding usually applied in a time base to a space based.

The STTD can be applied to every downlink physical channels except a synchronization channel (SCH) of WCDMA, in which there is no need for feedback information transmitted from a receiving end to a transmitting end, and accordingly it is advantageous to have diversity of system performances according to variation of speed and a radio channel.

The STTD technique uses two transmit antennas and a single receive antenna, by which diversity advantages of space and time can be achieved together by simply performing a space-time coding with respect to symbols transmitted through the two antennas. For this purpose, the conventional STTD system requires two transmit antennas and a space-time coding block (namely, an STTD encoder) in order to code symbols therebetween transmitted through the two transmit antennas. The STTD is operated as can be seen from [Table 1].

TABLE 1

|           | Time t    | Time t + T |
|-----------|-----------|------------|
| Antenna 1 | $s_1$     | $s_2$      |
| Antenna 2 | $-s_2^*$  | $s_1^*$    |

Here, the mark '*' denotes a conjugate.

Referring to [Table 1], symbols to be transmitted are encoded in the STTD encoder and transmitted to Antenna 1 and Antenna 2, respectively, according to time sequence. The signals transmitted to the respective antennas go through independent channels different from each other. Assuming that a channel in a time t is identical to a channel in a time t+T (T refers to a symbol period), received signals $r_1, r_2$ of the receiving end can be shown in Equation (1) herebelow.

$$r_1 = r(t) = h_1 s_1 - h_2 s_2^* + n_1$$
$$r_2 = r(t+T) = h_1 s_2 + h_2 s_1^* + n_2 \quad \text{Equation (1)}$$

Here, $h_1 = \alpha_1 e^{j\theta_1}$ and $h_2 = \alpha_2 e^{j\theta_2}$ refer to channels between each transmit antenna and the single receive antenna, and $n_1$ and $n_2$ refer to additive white Gaussian noise (AWGN) in the receiving end. In addition, each channel $h_1$ and $h_2$ may be estimated from a pattern of a pilot signal transmitted from the respective transmit antennas.

Therefore, once combining the two received signals $r_1$ and $r_2$ therewith in the receiving end as shown in Equation (2), it is possible to obtain the same value as an MRC (Maximum Ratio Combining) method of a receiving diversity. On the basis of this, the transmission symbol can be estimated.

$$\tilde{s}_1 = h_1^* r_1 + h_2^* r_2 = (\alpha_1^2 + \alpha_2^2) s_1 + h_1^* n_1 + h_2 n_2^*$$
$$\tilde{s}_2 = h_1^* r_2 - h_2 r_1^* = (\alpha_1^2 + \alpha_2^2) s_2 + h_1 n_2^* - h_2^* n_1 \quad \text{Equation (2)}$$

Double STTD

A double STTD (hereinafter, refer to D-STTD) is a method obtained by enlarging the STTD technique using only two transmit antennas to an MIMO (Multi Input Multi Output) system. Here, the D-STTD system using four transmit antennas can include two STTD pairs.

The D-STTD system has been first proposed in the 3GPP by Texas Instrument. After then, an antenna shuffling has been also proposed. In this antenna shuffling, different modulation methods (QPSK, QAM and the like) are applied to each STTD pair and the receiving end measures correlation between transmit antennas, thereby determining an STTD antenna pair. Furthermore, Mitsubishi Electric has been once proposed Sub group rate control D-STTD capable of applying an MCS (modulation and coding set) different from each other to the each STTD pair.

Figure 1:
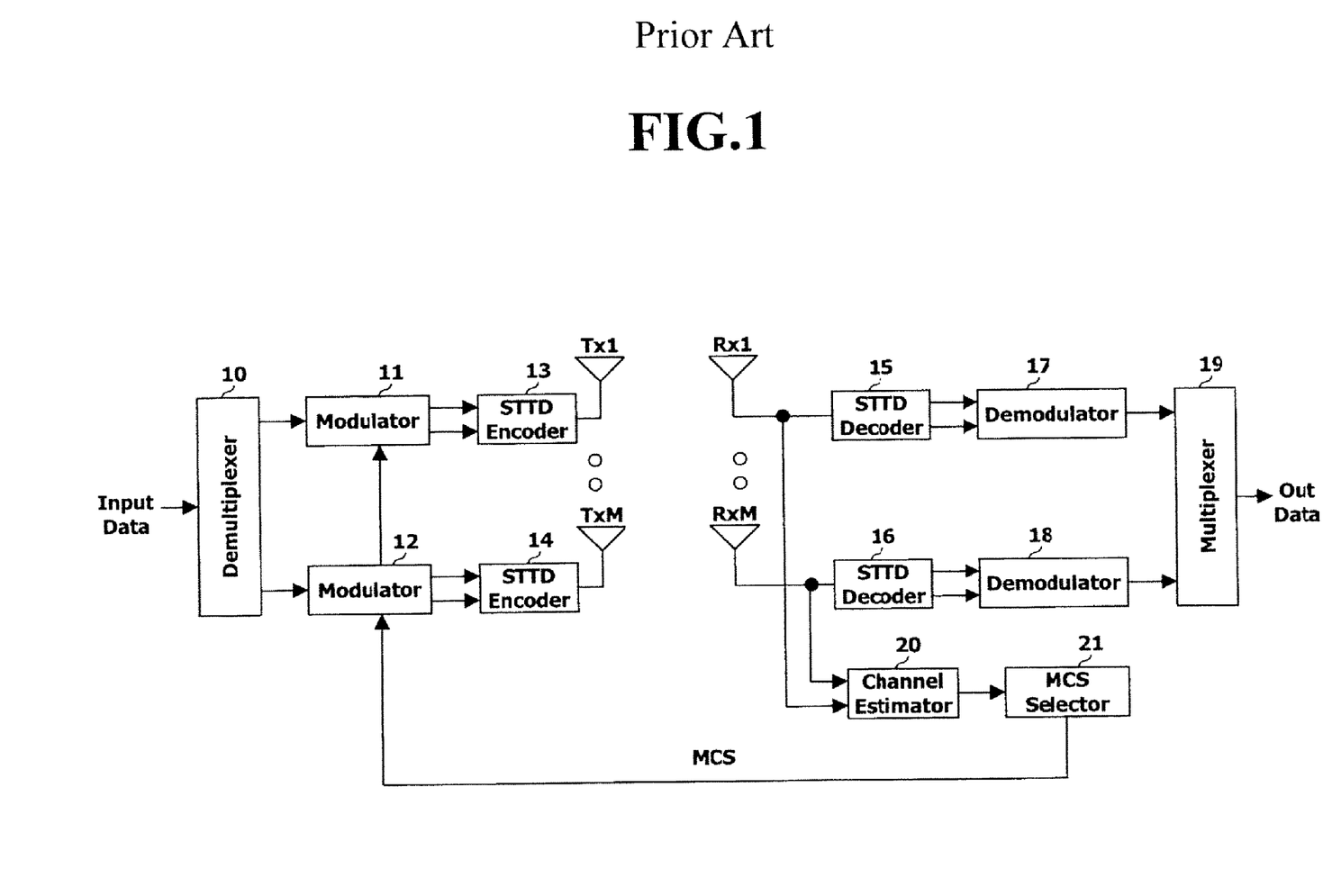
FIG. 1 is a schematic diagram showing a D-STTD system of the related art.

FIG. 1 is a schematic diagram showing a D-STTD system of the related art.

With reference to FIG. 1, data to be transmitted through the D-STTD system is separated in a demultiplexer 10 as a signal for two STTD pairs (each STTD pair includes a modulator, an STTD encoder and an antenna). The modulators 11 and 12 and the STTD encoders 13 and 14 of each STTD pair respectively modulate and code a signal by using a modulation and a coding rate selected depending on the MCS feedbacked from the receiving end. The transmitted signal passed through the respective modulators 11 and 12 and the respective STTD encoders 13 and 14 is transmitted through the transmit antenna pair. During this, the respective STTD encoders 13 and 14 receive two symbols at once from each modulator 11 and 12.

STTD decoders 15 and 16 and demodulators 17 and 18 of the receiving end decode and demodulate the signal received through the transmit antenna by using the MCS. The received signal demodulated by the respective demodulators 17 and 18 is then multiplexed at a multiplexer 19 and thereby recovered to the original data.

On the other hand, a channel predictor 20 of the receiving end receives the received signal and estimates a D-STTD channel matrix. An MCS selecting unit 21 calculates a signal to interference noise ratio (SINR) of each data stream on the basis of the estimated D-STTD channel matrix, and accordingly selects a proper MCS corresponding to the SINR of each data stream, thereafter feedbacking it to the transmitting end.

STTD Combined with Beamforming

Figure 2:
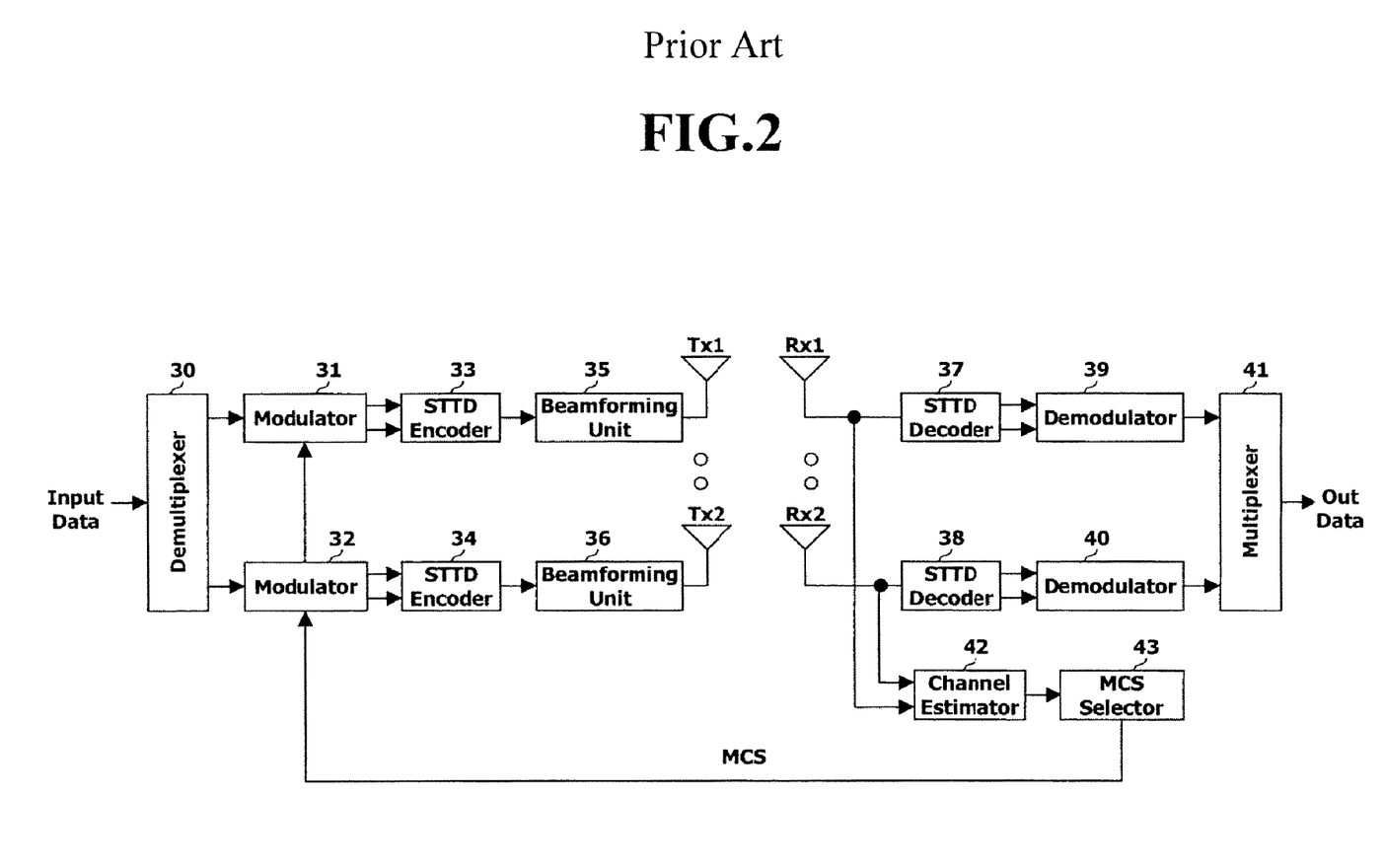
FIG. 2 is a schematic diagram showing an STTD system with which a beamforming is combined of the related art.

FIG. 2 is a schematic diagram showing an STTD system combined with a beamforming of the related art. As can be seen from FIG. 2, the D-STTD system additionally includes beamforming units 22 and 23, which can be applied when using only two transmit antennas.

Referring to FIG. 2, first, data (a signal) to be transmitted is demultiplexed at the demultiplexer 30 and then inputted to each modulator 31 and 32. Each modulator 31 and 32 and each STTD encoder 33 and 34 respectively modulate and code the demultiplexed signal according to a modulation and a coding rate selected with reference to an MCS feedbacked from the receiving end. During this, the STTD encoders 33 and 34 receive two symbols at once from the respective modulators 31 and 32.

Beamforming units 35 and 36 perform a beamforming by multiplying a symbol (e.g., $s_1$ and $s_2$) which is space-time coded (STTD-performed) at each STTD encoder 33 and 34 by an eigenvector, and thereafter transmit it through each transmit antenna. In this case, the following Equation (3) will show a signal processing operation for performing the beamforming in addition to the STTD.

$$\begin{bmatrix} s_1 & s_2 \\ -s_2^* & s_1^* \end{bmatrix} \begin{bmatrix} w_1 & w_2^* \\ w_2 & -w_1^* \end{bmatrix} \begin{bmatrix} \sqrt{1+\beta} & 0 \\ 0 & \sqrt{1-\beta} \end{bmatrix} \quad \text{Equation (3)}$$

Here, [$w_1$ $w_2$] refers to an eigenvector corresponding to a maximum eigenvalue of a half-square matrix $\underline{\underline{R}}_T^{1/2}$ of a correlation matrix between transmit antennas. Additionally, β may be defined as $$\beta = \left(\frac{1}{\lambda_2^2} - \frac{1}{\lambda_1^2}\right) \bigg/ \left(\frac{E_s}{\sigma^2}\right)$$

in case of using two transmit antennas. At this time, the $\lambda_1$ and $\lambda_2$ ($\lambda_2$)$\lambda_1$) refer to eigenvalues of the $\underline{\underline{R}}_T^{1/2}$. Also, $E_s$ and $\sigma^2$ depict symbol energy and Gaussian noise, respectively.

Therefore, because the receiving end has already known of the MCS and eigenvector values $w_1$ and $w_2$, the respective STTD decoders 37 and 38 and the respective demodulators 39 and 40 decode and demodulate the received signal with reference to the MCS and the eigenvector. Then, the received signal demodulated at the respective demodulators 39 and 40 is converted into a serial data item at a multiplexer 41, and accordingly restored to an original data stream.

During this, the channel predictor 42 of the receiving end receives the received signal and estimates an STTD channel matrix. An MCS selecting unit 43 then calculates a signal to interference noise ratio (SINR) of each data stream depending on the estimated STTD channel matrix, and then selects an MCS corresponding to the SINR of each data stream, thereafter feedbacking it to the transmitting end.

As aforementioned, in the D-STTD system of the related art, in case that there are more than four transmit antennas therein, the transmit antennas are bound as two antenna pairs, and a plurality of data streams are transmitted through the corresponding antenna pair.

However, there exists a degree of correlation between the transmit antennas, it is not preferable to simply set the two adjacent antennas as a pair for an STTD encoding. Therefore, once obtaining the correlation between the transmit antennas directly in the receiving end, information to determine a transmit antenna pair can be feedbacked to the transmitting end. However, in case of using this method, it is very difficult for the receiving end to obtain the correlation between the transmit antennas, and accordingly the method may also be actually difficult to be applied.

In addition, as aforementioned, in the STTD system combined with the beamforming of the related art, in case that there are two transmit antennas, after performing the beamforming by multiplying the STTD-encoded data by the eigenvector, it is transmitted through each transmit antenna. However, this method for transmitting a signal is a signal processing method adopted only in case of using two transmit antennas, so that it is hard to be applied as it is when using more than two transmit antennas.

Furthermore, in the method for transmitting a signal combined with the beamforming, the eigenvector corresponding to the maximum eigenvalue of the half-square matrix of the correlation matrix (configuring the correlation value between the transmit antennas as a matrix) is used as a weight value for the beamforming. However, obtaining the value of the correlation matrix of the transmitting end is actually very difficult, so that the STTD combined with the beamforming of the related art can not be easily applied.

That is, in the related art, in case of using two transmit antennas in the STTD system, the eigenvector has been used as the weight value to be used for the beamforming in condition that it is possible to obtain the eigenvector corresponding to the maximum eigenvalue of the correlation matrix configured with the correlation value between transmit antennas.

By the way, because the channel matrix measured by the receiving end includes the correlation value between transmit antennas, the correlation value between receive antennas, and a channel value in a radio channel circumstance all together, it is actually very hard to separate only the correlation value between the transmit antennas from the channel matrix. Furthermore, the correlation value between the transmit antennas in an actual circumstance can be varied depending on time. The method for obtaining the weight value by using the correlation value between the transmit antennas of the related art may thus be hard to be actually applied.

Moreover, in case that there are one or more receiving end antennas, the correlation value between the receiving end antennas should be considered, but the method for transmitting a signal of the related art only considers the correlation between transmit antennas. As a result, it is not an actually proper method for application.

SUMMARY OF THE INVENTION

Therefore, an object of the present invention is to provide a method for transmitting a signal capable of improving data transmission speed and a receiving rate in a D-STTD system and a system with which beamforming is combined.

Another object of the present invention is to provide a method for transmitting a signal for feedbacking information to determine a transmit antenna pair from a receiving end to a transmitting end during a D-STTD transmission.

Still another object of the present invention is to provide a method for transmitting a signal for applying more efficiently an STTD method with which beamforming is combined.

Yet another object of the present invention is to provide a method for transmitting a signal for performing a space-time multiplexing (STTD) and a beamforming by each antenna pair.

To achieve these and other advantages and in accordance with the purpose of the present invention, as embodied and broadly described herein, there is provided a method for transmitting a signal, in a double-space-time transmit diversity (STTD) system (D-STTD) for transmitting a data stream through each STTD pair including two antennas, the method in which a receiving end calculates a signal to interference noise ratio (SINR) with respect to every antenna pairs forming an STTD pair to be transmittable from a transmitting end, and feedbacks antenna pair determination information for a D-STTD transmission to the transmitting end.

Preferably, the antenna pair determination information indicates an antenna pair showing the greatest SINR, namely, an antenna pair having an instantaneous maximum reception data amount.

Preferably, the antenna pair determination information is transmitted by a separate feedback signal designated between transmitting and receiving ends. Also, the antenna pair determination information can be transmitted together with another feedback signal designated between the transmitting and receiving ends. In this case, the another feedback signal refers to information of a modulation and coding set (MCS) to be used in the antenna pair determined by the antenna pair determination information.

According to another embodiment of the present invention, there is provided a method for transmitting a signal, in a space-time transmit diversity (STTD) system for transmitting a space-time multiplexed and beam-formed symbol through a plurality of antennas, the method comprising the steps of: calculating an eigenvector of a channel matrix with respect to each transmit antenna and accordingly feedbacking it to a transmitting end; and performing a beamforming with respect to the STTD-performed transmission symbol by using the feedbacked eigenvector as a weight vector.

Preferably, the channel matrix includes a correlation value between transmit antennas, a correlation value between receive antennas and a channel value in a radio channel circumstance all together.

Preferably, the eigenvector is feedbacked from the receiving end to the transmitting end, and corresponds to a maximum eigenvalue of the channel matrix calculated at the receiving end.

According to still another embodiment of the present invention, there is provided a method for transmitting a signal, in a system for performing a space-time multiplexing and a beamforming with respect to a transmission symbol, the method comprising the steps of: calculating an eigenvector of a channel matrix of a transmit antenna pair which has the greatest instantaneous maximum reception data amount and accordingly feedbacking it to a transmitting end; and performing in the transmitting end a beamforming with respect to the transmission symbol STTD-performed by an antenna pair, by using the feedbacked eigenvector as a weight vector.

Preferably, the weight vector is an eigenvector of an actual channel matrix with respect to each antenna pair.

Preferably, the channel matrix includes a correlation value between transmit antennas, a correlation value between receive antennas and a channel value in a radio channel circumstance all together.

Preferably, the transmit antenna pair is an antenna pair having the greatest signal to interference noise ratio (SINR).

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There is proposed a method for transmitting a signal in a mobile communications system using a plurality of transmit antennas and receive antennas, for instance, a D-STTD system, an STTD system with which a beamforming is combined, or the like. For this purpose, a transmitting end having a plurality of transmit antennas receives from a receiving end MCS information, determination information of an STTD pair (an antenna pair) and/or an eigenvector by a feedback signal, and accordingly performs a D-STTD transmission or a beamforming.

Preferably, the feedback signal may be predetermined by an agreement between transmitting and receiving ends. Also, the MCS information to be used in the determined antenna pair is transmitted by using separate feedback information. The MCS information should be predetermined at the transmitting end and the receiving end and have the number of respective cases as a table type. Furthermore, it is possible to form a designated feedback information table by using the feedback information with respect to the determined antenna pair and the MCS information to be used in each antenna.

First, according to an embodiment of the present invention, a method for transmitting a signal proposes a method in a D-STTD system, in which a receiving end determines an STTD pair (an antenna pair) to thereafter feedback it to a transmitting end, and the transmitting end performs a symbol transmission according to the feedbacked information. For this purpose, the receiving end estimates a channel of each transmit antenna to thereafter calculate a signal to interference noise ratio (SINR) with respect to each STTD pair. According to this, the receiving end then determines an antenna pair having the greatest SINR, thereby feedbacking it to the transmitting end.

According to another embodiment of the present invention, a method for transmitting a signal proposes a method for calculating a weight value for performing a beamforming in an STTD system with which a beamforming is combined, and particularly, a method for efficiently applying the beamforming-combined STTD method in case that there are two or more transmit antennas. For this purpose, a receiving end of the present invention estimates a channel matrix including correlation between transmit antennas, a channel condition under a radio circumstance and correlation between receive antennas all together. Then, the receiving end feedbacks an eigenvector corresponding to a maximum eigenvalue of the estimated channel matrix as a weight value required for a beamforming of a transmitting end.

Furthermore, in the present invention, when there are two or more transmit antennas in the beamforming-combined STTD system, a transmit antenna pair is formed, and then a space-time multiplexing (STTD) and a beamforming are performed with respect to a symbol to be transmitted through each transmit antenna pair.

First, it will be explained how to feedback antenna pair determination information in a D-STTD system.

Figure 3:
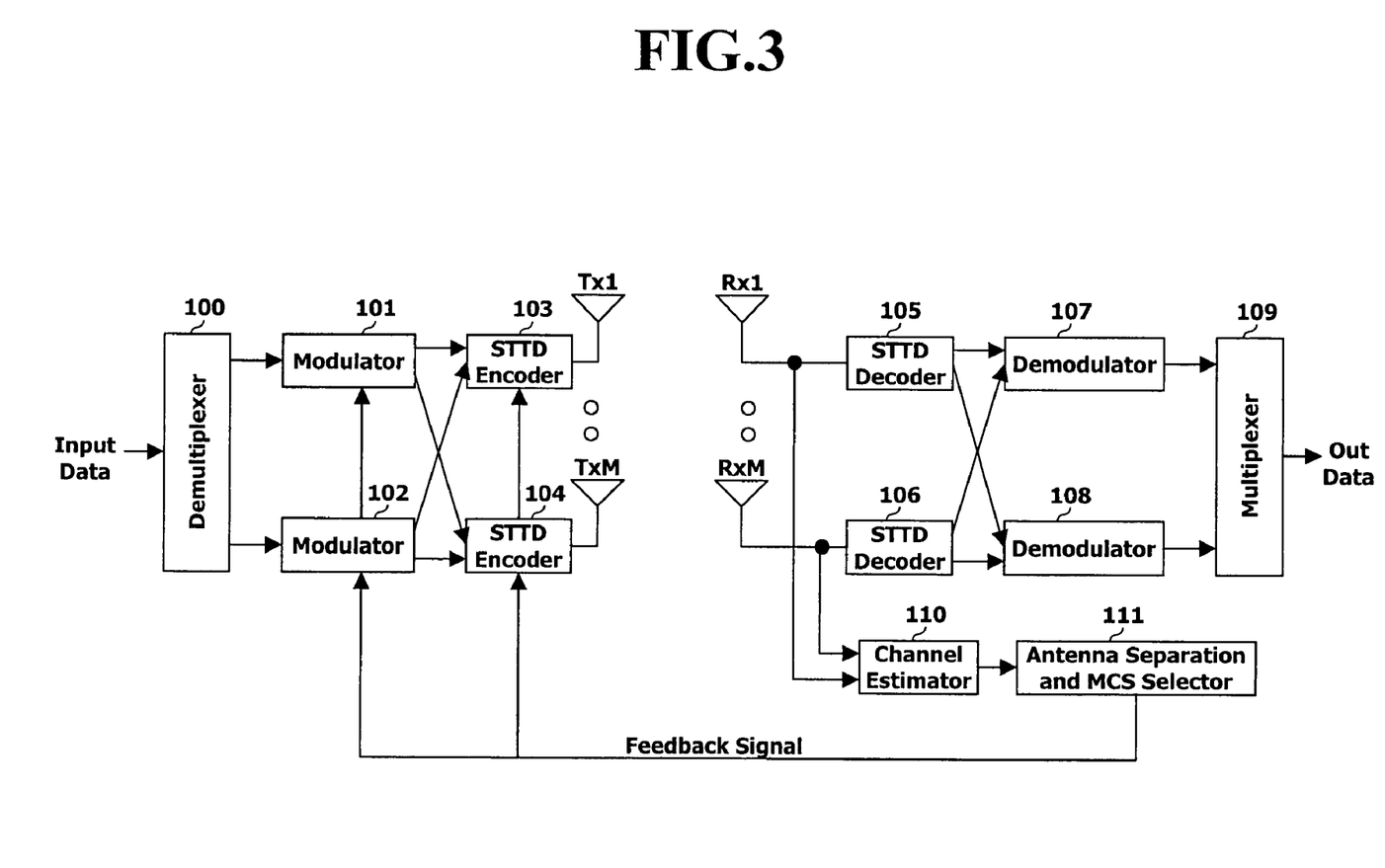
FIG. 3 is a schematic diagram showing a D-STTD system applied to the present invention.
Figure 4:
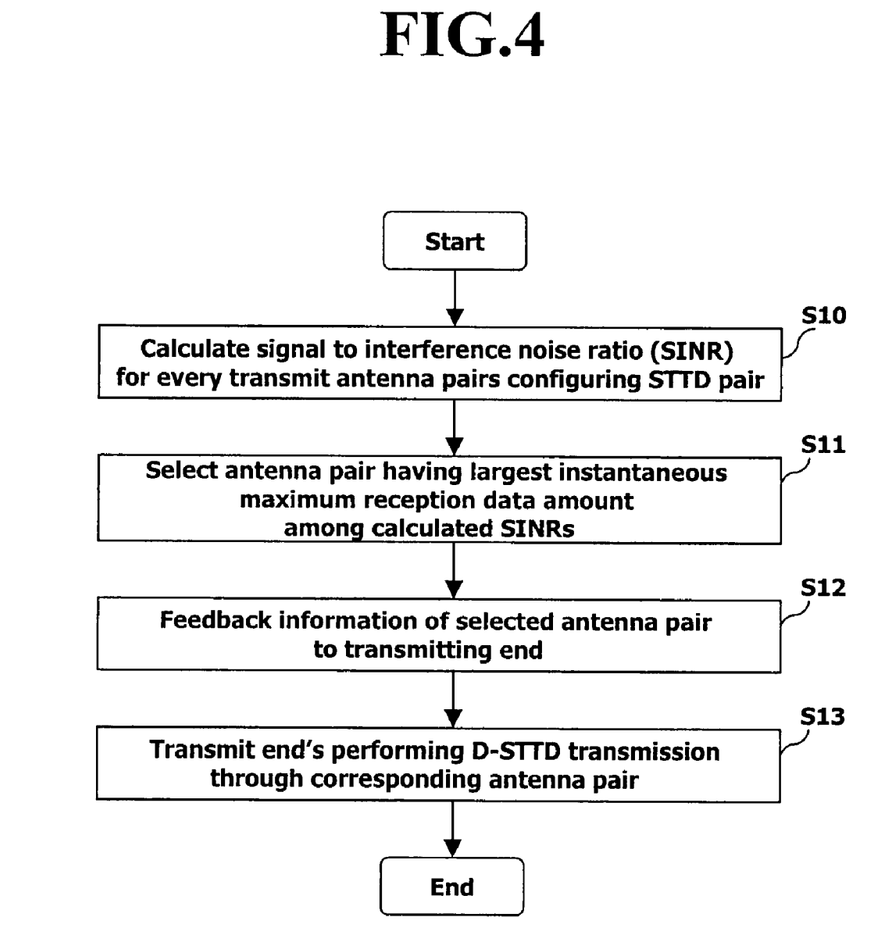
FIG. 4 is a flow chart showing how to transmit a signal in a D-STTD system according to the present invention.

FIG. 3 is a schematic diagram showing a D-STTD system applied to the present invention, FIG. 4 is a flow chart showing a procedure for determining and feedbacking antenna pair determination information to be used in a transmitting end. The D-STTD system shown in FIG. 3, has the same configuration as the conventional D-STTD system shown in FIG. 1 except an antenna separation and MCS selecting unit 111. It shows only different reference numerals therefrom.

The antenna separation and MCS selecting unit 111 determines an MCS to be used in the transmitting end and an antenna pair for an STTD transmission, and feedbacks the determined information to respective modulators 101 and 102 and respective STTD encoders 103 and 104 by a feedback signal.

Referring to FIGS. 3 and 4, in the D-STTD system, a receiving end calculates a signal to interference noise ratio (SINR) with respect to every antenna pairs configuring an STTD pair to be transmittable from a transmitting end. Once having calculated the SINR, the receiving end selects an antenna pair corresponding to the greatest SINR among calculated SINRs, namely, an antenna pair having the greatest instantaneous maximum reception data amount, and thereafter the receiving end feedbacks the information of the selected antenna pair together with the MCS to the transmitting end (steps S11 and S12). Therefore, the transmitting end performs a D-STTD transmission by using the MCS and the antenna pair (the STTD pair) determined by the information feedbacked from the receiving end (step S13).

For instance, assuming that the D-STTD system shown in FIG. 3 uses four transmit antennas (TX1~TX4) and a receive antenna (Rx) and $h_{11}$, $h_{12}$, $h_{13}$ and $h_{14}$ are channels between each transmit antenna (TX1~TX4) and the receive antenna (Rx). A channel matrix $\underline{\underline{A}}$ to be estimated in a channel predictor 110 can be depicted as shown in Equation (4) herebelow.

$$\underline{\underline{A}} = [\,\underline{a}_1\ \ \underline{a}_2\ \ \underline{a}_3\ \ \underline{a}_4\,] = \begin{bmatrix} h_{11} & h_{12} & h_{13} & h_{14} \\ h_{12}^* & -h_{11}^* & h_{14} & -h_{13}^* \end{bmatrix} \quad \text{Equation (4)}$$

At this time, since two STTD pairs can be formed with respect to the four transmit antennas (TX1~TX4), as can be seen from FIGS. 1 and 2, the antenna separation and MCS selecting unit 111 obtains the SINR for each STTD pair as shown in Equations (5) and (6) by using an MMSE (Minimum Mean Square Error) reception algorithm with respect to the two STTD pairs.

$$SINR_1 = \underline{a}_1^H [\underline{a}_2\underline{a}_2^H + \underline{a}_3\underline{a}_3^H + \underline{a}_4\underline{a}_4^H + \sigma^2 \underline{\underline{I}}]^{-1} \underline{a}_1 \quad \text{Equation (5)}$$

$$SINR_2 = \underline{a}_3^H [\underline{a}_1\underline{a}_1^H + \underline{a}_2\underline{a}_2^H + \underline{a}_4\underline{a}_4^H + \sigma^2 \underline{\underline{I}}]^{-1} \underline{a}_3 \quad \text{Equation (6)}$$

The $SINR_1$ refers to a signal to interference noise ratio with respect to a data stream when setting Tx1 and Tx2 as an STTD pair, while the $SINR_2$ refers to the signal to interference noise ratio with respect to a data stream when setting Tx3 and Tx4 as another STTD pair. Also, in those Equations, $\sigma^2$ refers to Gaussian noise in the receive antenna, and H refers to a Hermitian operation of a vector formed of a complex number.

Here, assuming that (1, 2) denotes the STTD pair for Tx1 and Tx2, and (3,4) denotes the STTD pair for Tx3 and Tx4, a configuration of the channel matrix of Equation (4) indicates a channel matrix for obtaining the SINR when performing the D-STTD with the STTD pairs (1,2) and (3,4).

Thus, in case of performing the D-STTD with the STTD pairs (1,3) and (2,4), the channel matrix is configured as shown in Equation (7) herebelow, and thereafter the SINR can be obtained by using Equations (5) and (6).

$$\underline{\underline{A}} = [\,\underline{a}_1\ \ \underline{a}_2\ \ \underline{a}_3\ \ \underline{a}_4\,] = \begin{bmatrix} h_{11} & h_{13} & h_{12} & h_{14} \\ h_{13}^* & -h_{11}^* & h_{14} & -h_{12}^* \end{bmatrix} \quad \text{Equation (7)}$$

That is, a column sequence of the channel matrix shown in Equation (6) corresponds to (1,3,2,4) when the column sequence of the channel matrix shown in Equation (4) is (1,2,3,4). Therefore, in the channel matrix obtained when performing the D-STTD with the STTD pairs (1,3) and (2,4), because only the column sequence has been changed, the SINR for each STTD pair can be obtained by using Equations (5) and (6).

Using the same method, with respect to the STTD pairs such as (1,4)(2,3)/(1,2)(4,3)/(1,3)(4,2)/(1,4)(3,2), the SINR of each data stream can be obtained by changing a configuration of the channel matrix and then using the equations (Equations (5) and (6)) of the same SINR.

By using this obtained SINR, the antenna separation and MCS selecting unit 111 feedbacks the MCS method and the antenna pair determination information to the transmitting end. In this case, the MCS indicates the instantaneous maximum reception data amount receivable in the current receiving end.

However, because the channel condition is continually changed, the instantaneous maximum reception data amount receivable in the receiving end is also changed. Therefore, the antenna separation and MCS selecting unit 111 obtains the SINR for each antenna pair (each STTD pair), and selects an antenna pair having the greatest instantaneous maximum reception data amount as an antenna pair for the transmit antennas, thereafter feedbacking it to the transmitting end.

Thus, the feedbacked MCS information is used in each modulator 31 and 32 and each STTD encoder 33 and 34 of the transmitting end for modulating and coding, and the antenna pair determination information is used for distributing an output of each modulator 101 and 102 and each STTD encoder 103 and 104 to be suitable for each antenna pair. Additionally, the receiving end performs a suitable signal processing opposite to a signal processing of the transmitting end through the STTD decoders 105 and 106, the demodulators 107 and 108 and the multiplexer 109, thereby restoring an original data.

Figure 5:
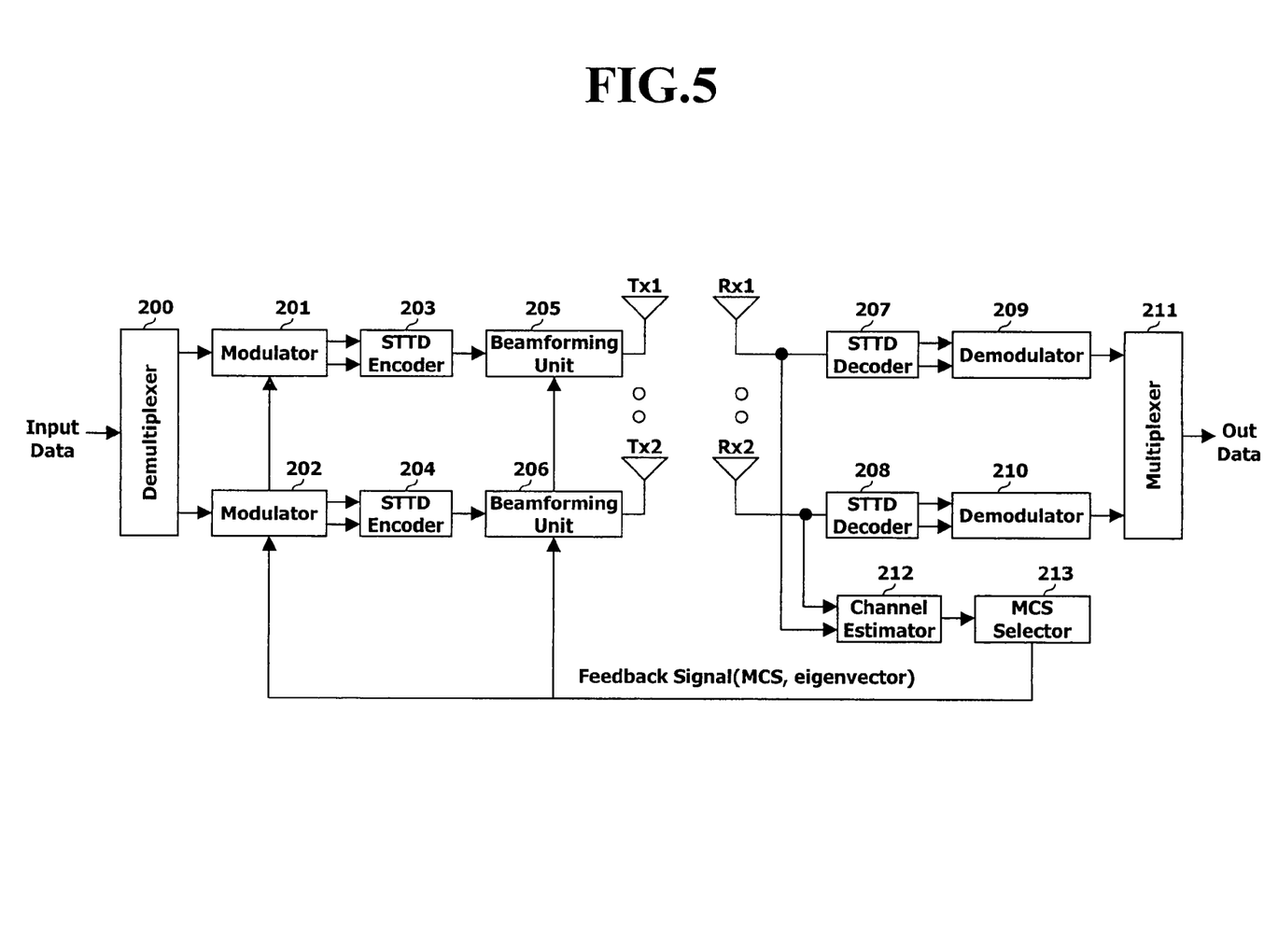
FIG. 5 is a schematic diagram showing an embodiment of an STTD system, with which a beamforming is combined, applied to the present invention.

FIG. 5 illustrates an example of the beamforming-combined STTD system according to the present invention. The STTD system shown in FIG. 5 has the same configuration as the conventional STTD system shown in FIG. 2 except an operation of an MCS selecting unit 213. It shows only different reference numerals therefrom.

The MCS selecting unit 213 calculates an eigenvector corresponding to a maximum eigenvalue of a channel matrix estimated at a channel predictor 212, and thereafter feedbacks it together with the MCS to the transmitting end by a feedback signal.

Referring to FIG. 5, an actual channel matrix estimated at the channel predictor 212 can be indicated as shown in Equation (8) herebelow.

$$\underline{\underline{H}}' = \underline{\underline{R}}_R^{1/2} \underline{\underline{H}} \underline{\underline{R}}_T^{1/2} \quad \text{Equation (8)}$$

Here, $\underline{\underline{R}}_R^{1/2}$ refers to a half-square matrix of a receiving correlation matrix configured with a correlation value between receive antennas, $\underline{\underline{R}}_T^{1/2}$ refers to a half-square matrix of a transmitting correlation matrix configured with a correlation value between transmitting antennas, and $\underline{\underline{H}}$ refers to a matrix configured with a channel value in a radio channel.

However, because an actual channel matrix $\underline{\underline{H}}'$ estimated at the receiving end includes a correlation value between transmit antennas, a correlation value between receive antennas and a channel value in a radio channel circumstance all together, it is very hard to separate only the correlation value between the transmit antennas from the channel matrix $\underline{\underline{H}}'$.

Therefore, the MCS selecting unit 213 of the receiving end calculates a weight value for an STTD and beamforming of the transmitting end by using an eigenvalue and an eigenvector of the channel matrix to be actually estimated at the receiving end. In the present invention, the eigenvector of the channel matrix $\underline{\underline{H}}'$ to be actually estimated at the receiving end can be used as the weight value for the beamforming of the transmitting end.

Accordingly, the modulators 201 and 202 and the STTD encoders 203 and 204 perform a modulation and an STTD with respect to a symbol (data stream) to be transmitted by using the MCS feedbacked from the receiving end. The beamforming units 205 and 206 multiply the STTD-performed symbol by the eigenvector (weight value) feedbacked from the receiving end and perform the beamforming, thereafter transmitting it to each transmit antenna.

For instance, in case that there are two transmit antennas, the transmitting end can transmit the symbol as a type that the STTD is combined with the beamforming as shown in Equation (9) herebelow.

$$\begin{bmatrix} s_1 & s_2 \\ -s_2^* & s_1^* \end{bmatrix} \begin{bmatrix} a_1 & a_2^* \\ a_2 & -a_1^* \end{bmatrix} \begin{bmatrix} \sqrt{1+\alpha} & 0 \\ 0 & \sqrt{1-\alpha} \end{bmatrix} \quad \text{Equation (9)}$$

Here, [$a_1$ $a_2$] refers to eigenvectors corresponding to a maximum eigenvalue of the channel matrix $\underline{\underline{H}}'$ to be actually estimated at the receiving end, $\alpha$ can be defined as $$\alpha = \left( \frac{1}{\varepsilon_2^2} - \frac{1}{\varepsilon_1^2} \right) / \left( \frac{E_s}{\sigma^2} \right)$$

when using two transmit antennas. At this time, $\epsilon_1$, and $\epsilon_2(\epsilon_{2>\epsilon 1})$ are eigenvalues of $\underline{\underline{H}}'$, $E_s$ refers to symbol energy, and $\sigma^2$ refers to energy of Gaussian noise.

In addition, the method for transmitting a signal according to the present invention in the beamforming-combined STTD system can be applied even in case of using four or more antennas without a limitation on four transmit antennas.

Figure 6:
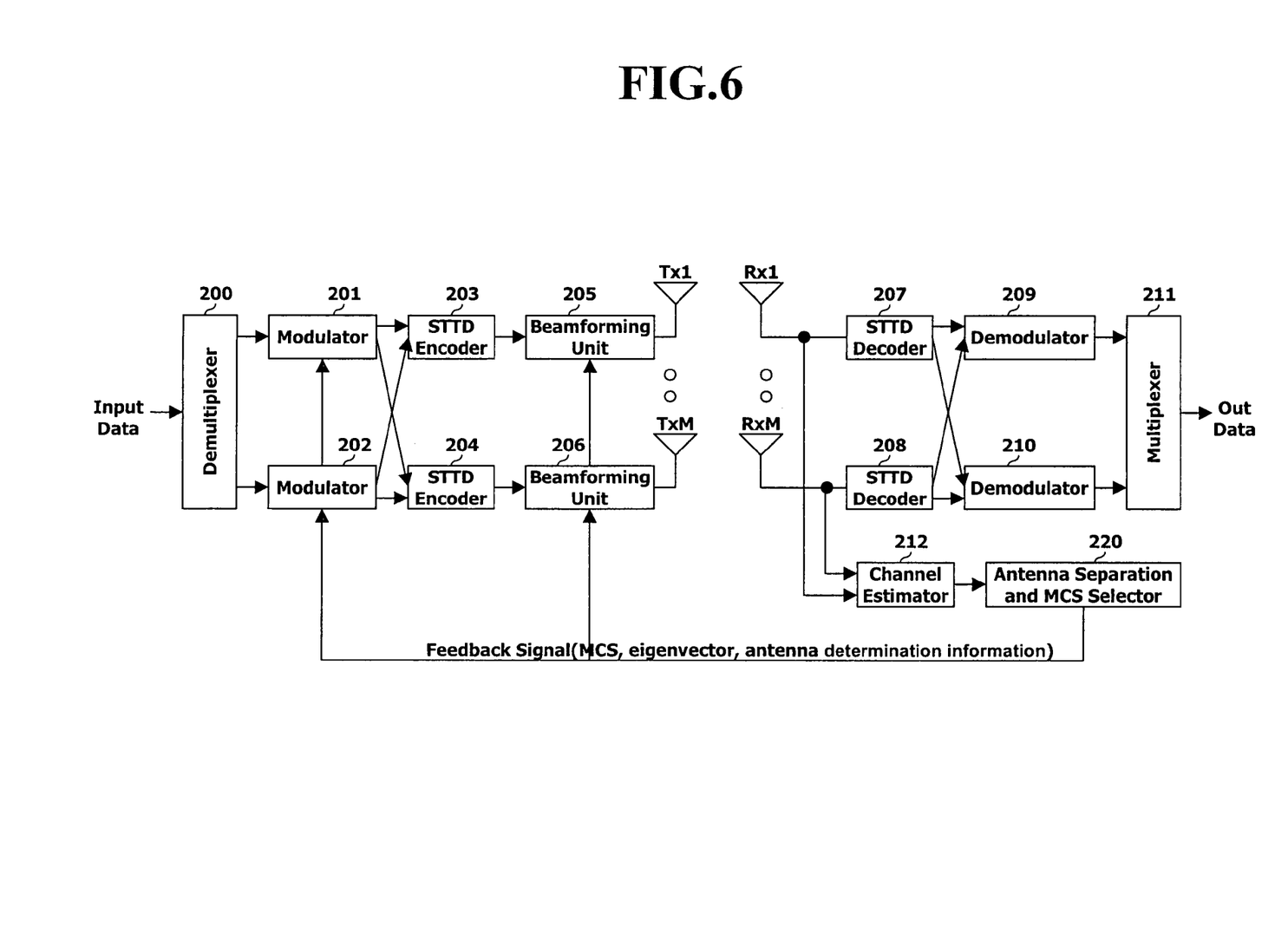
FIG. 6 is a schematic diagram showing another embodiment of the STTD system, with which the beamforming is combined, applied to the present invention.

FIG. 6 illustrates another embodiment of the beamforming-combined STTD system. The STTD system shown in FIG. 6 is used in case of using more than four transmit antennas, and actually has the same configuration as the STTD system shown in FIG. 5 except an antenna separation and MCS selecting unit 220.

The antenna separation and MCS selecting unit 220 performs a function for feedbacking a feedback signal (MCS), an eigenvector and antenna pair determination information to the modulators 201 and 202 and the beamforming units 205 and 206 of the transmitting end.

Referring to FIG. 6, a symbol (signal) to be transmitted is demultiplexed at the demultiplexer 220 and then inputted to an STTD pair (each STTD pair includes the modulator, the STTD encoder and the beamforming unit). Each modulator 201 and 202 and each STTD encoder 203 and 204 modulate and code the transmitted signal by using a modulation and a coding rate selected with reference to the MCS feedbacked from the receiving end. The beamforming units 205 and 206 multiply the symbol which has been space-time coded (STTD-performed) at each STTD encoder 203 and 204 by the eigenvector feedbacked from the receiving end. The beamforming units 205 and 206 then perform a beamforming, and thereafter transmit it to each transmit antenna pair.

Because the receiving end has already known of the MCS and the eigenvector, each STTD decoder 207 and 208 and each demodulator 209 and 210 decode and demodulate the received signal by using the MCS and the eigenvector. The received signal demodulated at each demodulator 209 and 210 is then converted into a serial data item at the multiplexer 211, and accordingly restored to an original symbol.

During this, the channel predictor 212 of the receiving end receives the received signal and estimates a channel matrix to be actually estimated thereat. The antenna separation and MCS selecting unit 230 feedbacks to the transmitting end the eigenvector corresponding to a maximum eigenvalue of the estimated channel matrix as a weight vector by the feedback signal.

Still referring to FIG. 6, in case of transmitting a symbol (stream) by using more than four transmit antennas, the present invention performs an STTD and a beamforming for each transmit antenna pair. That is, in case that there are four transmit antennas, each beamforming unit 205 and 206, for instance, performs the beamforming with respect to each antenna pair (1,2) and (3,4) as shown in Equation (9) above and Equation (10) herebelow.

$$\begin{bmatrix} s_3 & s_4 \\ -s_4^* & s_3^* \end{bmatrix} \begin{bmatrix} a_3 & a_4^* \\ a_4 & -a_3^* \end{bmatrix} \begin{bmatrix} \sqrt{1+\gamma} & 0 \\ 0 & \sqrt{1-\gamma} \end{bmatrix} \quad \text{Equation (10)}$$

Here, [$a_3$ $a_4$] refers to an eigenvector corresponding to a maximum eigenvalue of a channel matrix to be actually estimated at the receiving end with respect to the transmit antenna (3,4) and is feedbacked at the receiving end. $\gamma$ may be defined as $$\gamma = \left(\frac{1}{\chi_2^2} - \frac{1}{\chi_1^2}\right) \bigg/ \left(\frac{E_s}{\sigma^2}\right).$$

At this time, $\chi_1$ and $\chi_2 (\chi_2 > \chi_1)$ refer to eigenvalues of a channel matrix to be actually estimated at the receiving end corresponding to the transmit antenna (3, 4).

Therefore, in case that the transmitting end has the even number of transmit antennas, if a signal is transmitted by performing an STTD and a beamforming with setting two transmit antenna pairs, the method for transmitting a signal in case of using two transmit antennas can be applied thereto as well. In particular, in case of using more than four antennas, after setting the four antennas as two antenna pairs, the STTD and beamforming are sequentially performed, and thus it is possible to reduce an amount of weight value to be feedbacked from the receiving end (a terminal).

That is, in case of using four transmit antennas, once performing the STTD first, a signal is transmitted through two antenna pairs. As a result of this, two data streams can be transmitted at the same time, and there are only four ($a_1$, $a_2$, $a_3$, $a_4$) weight values to be feedbacked at the receiving end. However, in case that independent data streams are transmitted through the respective four antennas, because of multiplying a signal to be transmitted by four weight vectors of which dimension is 4×1, the receiving end should feedback totally 16 complex number values (eigenvalues) to the transmitting end. Whereas, in the present invention, because of multiplying each different STTD pair by two weight vectors of which dimension is 2×1, the receiving end should only feedback two weight vectors of which dimension is 2×1 to the transmitting end.

Therefore, when using more than four transmit antennas, after setting the four antennas as two pairs and performing the STTD, if the beamforming is performed with respect to each antenna pair, only two complex values with respect to each antenna pair is being feedbacked, so that the amount of feedback information can be remarkably reduced.

Furthermore, in case of performing the STTD and beamforming using four antennas, the antennas can be combined as various different pairs in addition to (1,2) and (3,4). Accordingly, the antenna separation and MCS selecting unit 220 of the receiving end, as shown in FIG. 4, calculates the signal to interference noise ratio (SINR) with respect to every antenna pairs (channel matrixes to be estimated), and accordingly can feedback the transmit antenna pair having the greatest SINR, namely, the largest instantaneous maximum reception data amount, to the transmitting end. During this, the antenna separation and MCS selecting unit 220 configures a channel matrix corresponding to the selected antenna pair, and calculates and feedbacks a weight value for the beamforming.

This method for transmitting a signal adopts advantages of the STTD as well as the beamforming, so as to be very effective when transmitting a plurality of data streams (symbols) independently. In the present invention, it has been explained of an example for the case of using four transmit antennas. Although more than four transmit antennas are used, the antennas can be extended by setting them as a pair by two antennas, so that there is no problem of expandability thereof.

As described above, in the present invention, by calculating the signal to interference noise ratio at the receiving end, an antenna pair configuring each STTD pair in order to receive the greatest signal to interference noise ratio at the receiving end can be selected. As a result, it is effective to improve a data transmission speed compared with the existing method.

In the present invention, in case of using a plurality of antennas in the beamforming-combined STTD system, it is effective to improve a data transmission speed and a data receiving rate which are advantages of the STTD and the beamforming by setting them as a pair by two antennas and performing the STTD and the beamforming together thereby to transmit a plurality of data streams. Furthermore, for the weight vector in order to perform the beamforming, the eigenvector of the channel matrix to be estimated at the receiving end is used thereas, so that it can be appropriate for an actual application.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for communicating a signal in a system for transmitting a symbol for which a space-time multiplexing (STTD) and a beamforming have been performed by a transmitting end, and having more than four transmit antennas, the method comprising:
    calculating a signal to interference noise ratio (SINR) with respect to transmit antenna pairs;
    determining two pairs of transmit antennas at least one of which has a greatest SINR among the transmit antenna pairs;
    calculating an eigenvector of a channel matrix with respect to the determined two pairs of transmit antennas;
    feeding back information on the determined two pairs of transmit antennas and the eigenvector to the transmitting end; and
    receiving the symbol according to the determined two pairs of transmit antennas using the eigenvector as a weight vector,
    wherein the channel matrix comprises a correlation value between the more than four transmit antennas, a correlation value between receive antennas, and a channel value in a radio channel circumstance.

2. The method of claim 1, wherein at least one of the transmit antenna pairs has a largest instantaneous maximum reception data amount.

3. The method of claim 1, wherein at least one of the determined two pairs of antennas has the greatest SINR.

4. The method of claim 1, wherein the antenna pair determination information is transmitted by a separate feedback signal designated between the transmitting end and a receiving end.

5. The method of claim 1, wherein the antenna pair determination information is combined with other information designated for transmission between the transmitting end and a receiving end.

6. The method of claim 5, wherein the other information comprises a modulation and coding set (MCS) for use in each antenna pair.

7. The method of claim 5, wherein the antenna pair determination information is managed and transmitted as a table type.

* * * * *